(12) United States Patent
Pan et al.

(10) Patent No.: US 6,304,844 B1
(45) Date of Patent: Oct. 16, 2001

(54) SPELLING SPEECH RECOGNITION APPARATUS AND METHOD FOR COMMUNICATIONS

(75) Inventors: James Pan, Stanford; Yoon Kim, Palo Alto; Josephine Chang, San Jose; Juinn-Yan Chen, Fremont, all of CA (US)

(73) Assignee: VerbalTek, Inc., San Jose, CA (US)

( * ) Notice: Subject to any disclaimer, the term of this patent is extended or adjusted under 35 U.S.C. 154(b) by 0 days.

(21) Appl. No.: 09/538,657

(22) Filed: Mar. 30, 2000

(51) Int. Cl.$^7$ .............. G10L 15/02; G10L 15/04; G10L 15/18
(52) U.S. Cl. .............. 704/257; 704/251; 704/231; 704/255
(58) Field of Search .............. 704/257, 254, 704/255, 251, 252

(56) References Cited

U.S. PATENT DOCUMENTS

| | | | |
|---|---|---|---|
| 5,208,897 | * 5/1993 | Hutchins | 704/200 |
| 5,621,857 | * 4/1997 | Cole et al. | 704/232 |
| 5,677,990 | * 10/1997 | Junqua | 704/232 |
| 5,987,410 | * 11/1999 | Kellner et al. | 704/256 |
| 6,108,627 | * 8/2000 | Sabourin | 704/260 |

OTHER PUBLICATIONS

Rabiner, L. and Juang, B.H., in: Fundamentals of Speech Recognition, Prentice–Hall, pp. 70–72, 100–107, 143, 163–166, 221–230 (1993).

\* cited by examiner

*Primary Examiner*—Richemond Dorvil
*Assistant Examiner*—Daniel A. Nolan
(74) *Attorney, Agent, or Firm*—Robert H. Chen; Antoinette F. Konski; Baker & McKenzie

(57) ABSTRACT

An accurate speech recognition system capable of rapidly processing greater varieties of words and operable in many different devices, but without the computational power and memory requirements, high power consumption, complex operating system, high costs, and weight of traditional systems. The utilization of individual letter utterances to transmit words allows voice information transfer for both person-to-person and person-to-machine communication for mobile phones, PDAs, and other communication devices. This invention is an apparatus and method for a speech recognition system comprising a microphone, front-end signal processor for generating parametric representations of speech input signals, a pronunciation database, a letter similarity comparator for comparing the parametric representation of the input signals with the parametric representations of letter pronunciations, and generating a sequence of associations between the input speech and the letters in the pronunciation database, a vocabulary database, a word similarity comparator for comparing an aggregated plurality of the letters with the words in the vocabulary database and generating a sequence of associations between them, and a display for displaying the selected letters and words for confirmation.

22 Claims, 10 Drawing Sheets

SPELLING SPEECH RECOGNITION APPARATUS AND METHOD FOR COMMUNICATIONS

FIELD OF THE INVENTION

This invention relates generally to speech recognition systems and more specifically to a speech recognition system for mobile communication devices.

BACKGROUND OF THE INVENTION

Transmission of information from humans to machines has been traditionally achieved though manually-operated keyboards, which presupposes machines having dimensions at least as large as the comfortable finger-spread of two human hands. With the advent of electronic devices requiring information input but which are smaller than traditional personal computers, the information input began to take other forms, such as pen pointing, touchpads, and voice commands. The information capable of being transmitted by pen-pointing and touchpads is limited by the display capabilities of the device (such as personal digital assistants (PDAs) and mobile phones). Therefore, significant research effort has been devoted to speech recognition systems for electronic devices. Among the approaches to speech recognition by machine is for the machine to attempt to decode a speech signal waveform based on the observed acoustical features of the signal and the known relation between acoustic features and phonetic sounds. This acoustic-phonetic approach has been the subject of research for almost 50 years, but has not resulted in much success in practice (rf. *Fundamentals of Speech Recognition*, L. Rabiner & B. H. Juang, Prentice-Hall). Problems abound, for example, it is known in the speech recognition art that even in a speech waveform plot, "it is often difficult to distinguish a weak, unvoiced sound (like "f" or "th") from silence, or a weak, voiced sound (like "v" or "m") from unvoiced sounds or even silence" and there are large variations depending on the identity of the closely-neighboring phonetic units, the so-called coarticulation of sounds (ibid.). After the decoding, the determination of the word in the acoustic-phonetic approach is attempted by use of the so-called phoneme lattice which represents a sequential set of phonemes that are likely matches to spoken input. The vertical position of a phoneme in the lattice is a measure of the goodness of the acoustic match to phonetic unit ("lexical access"). But "the real problem with the acoustic-phonetic approach to speech recognition is the difficulty in getting a reliable phoneme lattice for the lexical access stage" (ibid.); that is, it is almost impossible to label an utterance accurately because of the large variations inherent in any language.

In the pattern-recognition approach, a knowledge base of versions of a given speech pattern is assembled ("training"), and recognition is achieved through comparison of the input speech pattern with the speech patterns in the knowledge base to determine the best match. The paradigm has four steps: (1) feature extraction using spectral analysis, (2) pattern training to produce reference patterns for an utterance class, (3) pattern classification to compare unknown test patterns with the class reference pattern by measuring the spectral "distance" between two well-defined spectral vectors and aligning the time to compensate for the different rates of speaking of the two patterns (dynamic time warping, DTW), and (4) decision logic whereby similarity scores are utilized to select the best match. Pattern recognition requires heavy computation, particularly for steps (2) and (3) and pattern recognition for large numbers of sound classes often becomes prohibitive.

Therefore, systems relying on the human voice for information input, because of the inherent vagaries of speech (including homophones, word similarity, accent, sound level, syllabic emphasis, speech pattern, background noise, and so on), require considerable signal processing power and large look-up table databases in order to attain even minimal levels of accuracy. Mainframe computers and high-end workstations are beginning to approach acceptable levels of voice recognition, but even with the memory and computational power available in present personal computers (PCs), speech recognition for those machines is so far largely limited to given sets of specific voice commands. For devices with far less memory and processing power than PCs, such as PDAs, mobile phones, toys, entertainment devices, accurate recognition of natural speech has been hitherto impossible. For example, a typical voice-activated cellular phone allows preprogramming by reciting a name and then entering an associated number. When the user subsequently recites the name, a microprocessor in the cell phone will attempt to match the recited name's voice pattern with the stored number. As anyone who has used present day voice-activated cell phones knows, the match is sometimes inaccurate (due to inconsistent pronunciation, background noise, and inherent limitations due to lack of processing power) and only about 25 stored numbers are possible. In PDA devices, it is necessary for device manufacturers to perform extensive redesign to achieve even very limited voice recognition (for example, present PDAs cannot search a database in response to voice input).

As for spelling words for voice input, there is the problem with the confusable sets: {A,J,K}, {B,C,D,E,G,P,T,V,Z}, {Q,U}, {I,Y}, and {F,S,X}. These can generally only be discriminated based upon a small, critical portion of the utterance. Since conventional recognition relies on a simple accumulated distortion score over the entire utterance duration (a binary "yes" or "no"), this does not place sufficient emphasis on the critical parts resulting in poor recognition accuracy. Clearly, an approach would be to weight the critical portions, but this method has not achieved high recognition accuracy and carries a heavy computational burden.

In summary, the memory and computation necessary for accurate and fast voice recognition also require increased electrical power and complex operating systems; all of these carry increased cost. Thus present voice recognition technology is not feasible for mobile communication devices because of their weight, electrical power requirement, complexity, and cost.

SUMMARY OF THE INVENTION

There is a need, therefore, for an accurate speech recognition system capable of rapidly processing greater varieties of words and operable in many different devices, but without the computational power and memory requirements, high power consumption, complex operating system, high costs, and weight of traditional systems so that voice information transfer is feasible for both person-to-person and person-to-machine communication for mobile phones, PDAs, electronic toys, entertainment products, and any other devices requiring communication. This invention provides accurate speech recognition for electronic devices with low processing power and limited memory storage capability. Accuracy is achieved primarily through the utilization of individual alphanumeric character utterances to transmit words, thereby overcoming the lexical access problem. Because individual alphanumeric utterances produce speech waveforms which change very little over the time region and are separated by a pause (the typical pause between dictating individual characters or letters), this invention solves the problem of distinguishing weak, unvoiced sounds and the indefiniteness associated with coarticulation. This invention comprises a microphone, front-end signal processor for generating parametric representations of speech input signals, a pronunciation database, a letter similarity comparator for comparing the parametric representation of the input signals with the parametric representations of letter pronunciations, and generating a sequence of associations between the input speech and the letters in the pronunciation database, a vocabulary database, a word comparator for comparing an aggregated plurality of the letters with the words in the vocabulary database and generating a sequence of associations between them, and a display for displaying the selected letters and words for confirmation.

DETAILED DESCRIPTION OF THE INVENTION

Figure 1:
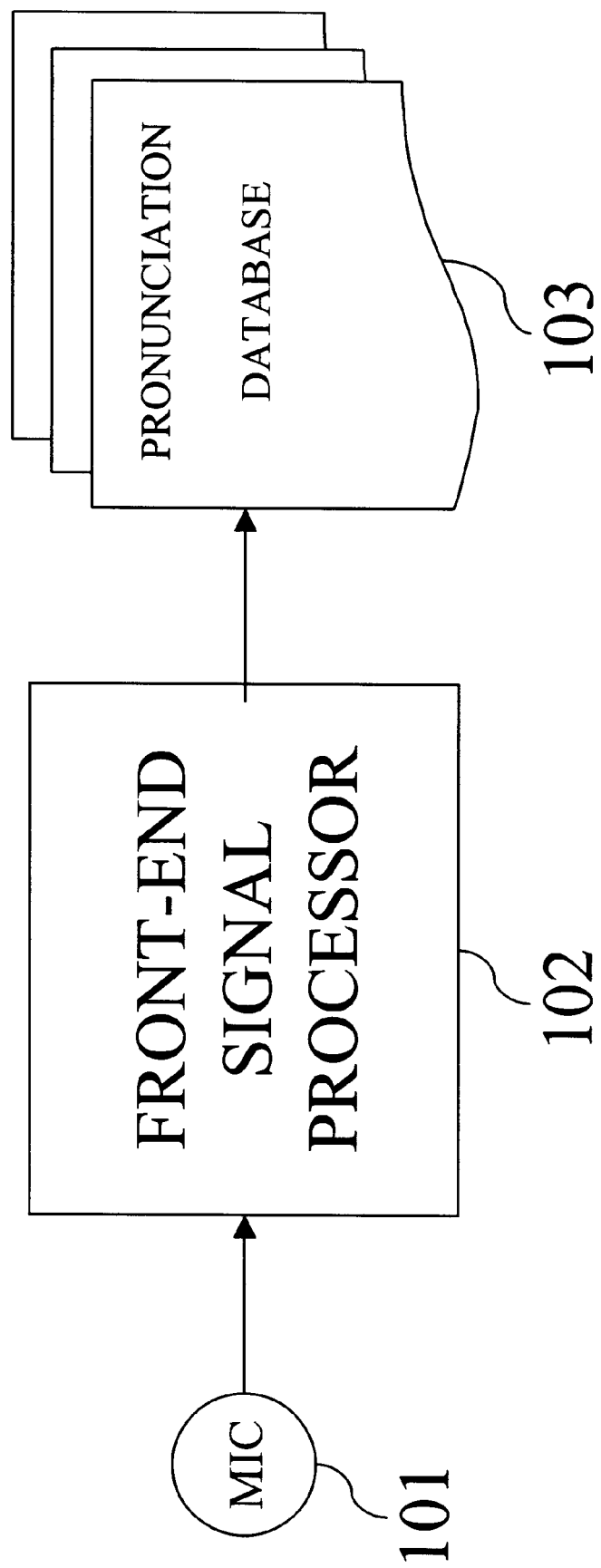
FIG. 1 is a block diagram of the system for creating a personalized database according to the present invention.

FIG. 1 is a block diagram of the personalized database 100 of the present invention. A microphone 101 receives an audio voice string (for example, letters of the alphabet or individual Chinese characters) and converts the voice string into an electronic waveform signal. A front-end signal processor 102 processes the waveform to produce a parametric representation of the waveform suitable for recognition and comparison. In the preferred embodiment, the voice string is processed by linear predictive coding (LPC), producing a parametric representation for each letter (so-called "feature extraction" which removes redundant information from the waveform data to describe more distinctly each audio signal). The result, for letters of the English alphabet, is a 26×26 matrix wherein columns hold the parametric representations of each character or letter and the rows will hold inputted speech characters or letters. In the present invention, the matrix is a "calibration template" consisting of the individual user's pronunciation of the letters stored in pronunciation database 103. Because voice inputs are calibrated by the calibration template, typical speech recognition inaccuracies are avoided n word comparisons.

Figure 2:
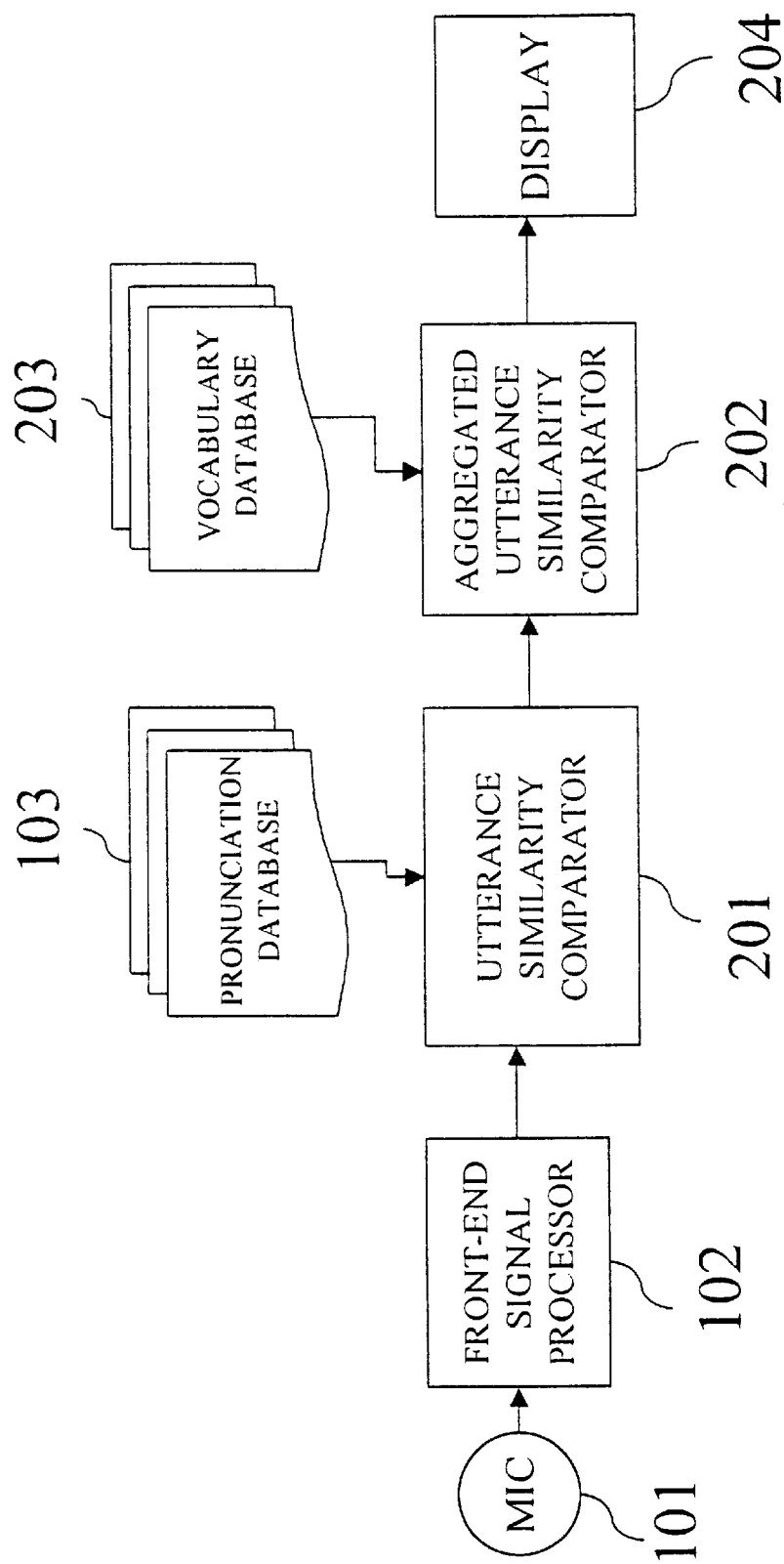
FIG. 2 is a block diagram of the speech recognition system according to the invention.

FIG. 2 is a block diagram of the preferred embodiment of the invention. The microphone 101 receives a sequence of inputted utterances which are transmitted to the front-end signal processor 102 to form a parameterized voice string waveform set which is then compared with the pronunciation database 103 using a letter comparator 201 to select the best match for the individual utterances (e.g., letters). As an example, suppose the name "Michael" is inaccurately pronounced "n-y-d-h-a-b-l" (some errors due to confusable pronunciations of letters). In one embodiment, letter comparator 201 accepts the voice string and determines the "distance" between the voice string utterances and the calibration template in pronunciation database 103 by testing the six letters in the example against all the letters in pronunciation database 103. In another embodiment, similarly pronounced letters (or any sounds) are grouped based on similarity, so the comparison is more efficient. Word similarity comparator 202 compares the calibrated sequence of letters to the entries in a prerecorded vocabulary database 203. In the example, even though letters of the word may not be accurately recognized, because there are only a limited number of sensible words such as "Michael", the chance of an accurate word match is considerably increased. In the preferred embodiment of the invention, vocabulary database 203 is a dictionary database available from the assignee of this invention, VerbalTek, Inc. Another embodiment of this invention advantageously utilizes a dictionary database from Motorola entered into vocabulary database 201. Still another embodiment of this invention utilizes address book entries by the user. The present invention contemplates word dictionaries consisting of any terms which are desired by the user for vocabulary database 203. For example, specialized words for specific areas of endeavor (commercial, business, service industry, technology, academic, and all professions such as legal, medical, accounting, and so on) can be advantageously entered into vocabulary database 203. Further, it is understood by those in the art that the present invention contemplates advantageous utilization for monosyllabic word languages such as Chinese. Through comparison of the pre-recorded waveforms in vocabulary database 203 with the inputted waveforms a sequential set of phonemes is generated that are likely matches to the spoken input, and a phoneme lattice is generated. The lattice is constructed by assigning each inputted waveform a "score" value based upon the closeness of each inputted combination to a word in vocabulary database 203. The "closeness" index is based upon a calculated distortion between the input waveform and the stored vocabulary waveforms, thereby generating "distortion scores". Since the scores are based on relatively accurate (compared with traditional speech recognition acoustic-phoneme methods) matches of letters or characters with a personalized pronunciation database, the phoneme lattice produces word matches at 95% and above accuracy. The best matches for the words are then displayed on display 204.

Figure 5:
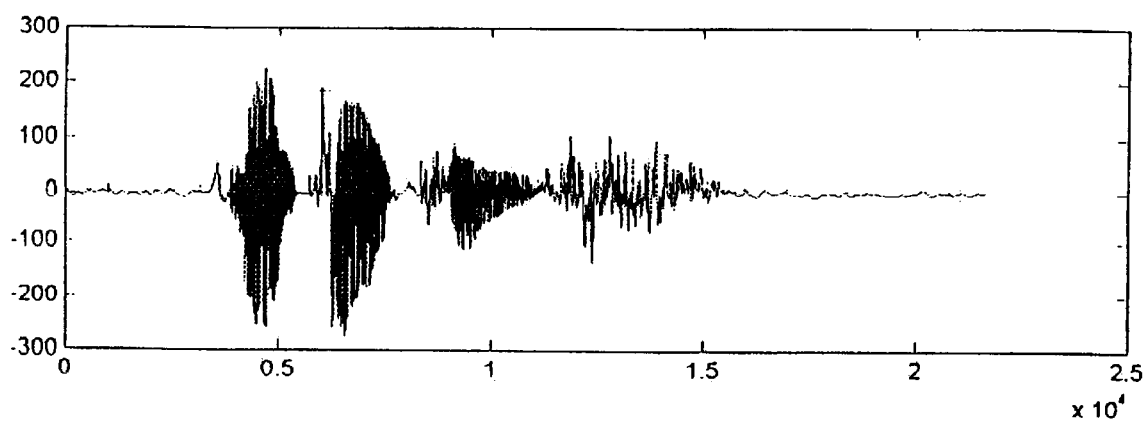
FIG. 5 is an example of a waveform for a letter as generated by the microphone according to the present invention.

In the preferred embodiment of the invention, the front-end signal processing to convert a speech waveform (an example of which is shown in FIG. 5) to a parametric representation utilizes linear predictive coding (LPC). LPC is particularly suited for the present invention because (1) LPC is more effective for the voiced regions of the speech spectral envelope than for the unvoiced regions, and the present invention advantageously utilizes spelling utterances which emphasize the distinctive letter sounds and have natural pauses (so that the unvoiced regions are less significant), and (2) LPC offers a computationally efficient representation that takes into consideration vocal tract characteristics (thereby allowing personalized pronunciations to be achieved with minimal processing and storage). The particular efficacy of LPC in the present invention is illustrated, for example, in the LPC autocorrelation method, where it is assumed that the speech segment is identically zero outside of a given interval (tantamount to multiplying the speech signal by a finite length window). In the LPC transfer function, H(z)=S(z)/GU(z), where the gain G of the source is estimated from the speech signal and the scaled source is used as input to a digital filter H(z), which is controlled by the vocal tract parameters characteristic of the speech being produced.

Figure 3:
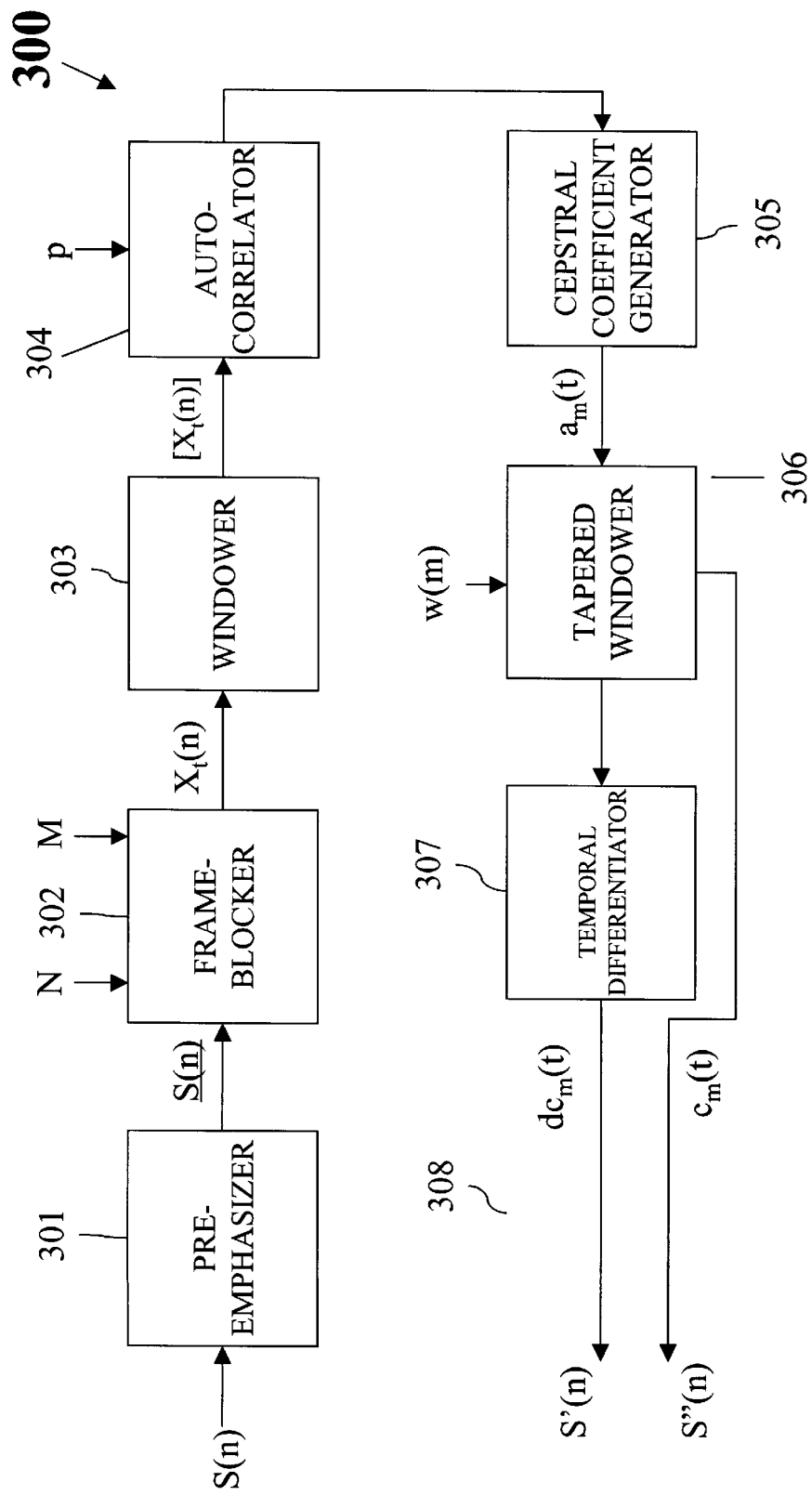
FIG. 3 is a block diagram of an LPC front-end processor according to the present invention.

FIG. 3 is a block diagram of an LPC front-end processor 102 according to the preferred embodiment of the invention. A preemphasizer 301 which preferably is a fixed low-order digital system (typically a first-order FIR filter) spectrally flattens the signal s(n), and is described by:

$$P(z)=1-az^{-1} \quad \text{(Eqn 1)}$$

where $0.9 \leq a \leq 1.0$. In another embodiment of the invention, preemphasizer 301 is a first-order adaptive system having the transfer function $$P(z)=1-a_n z^{-1} \quad \text{(Eqn 2)}$$

where $a_n$ changes with time (n) according to a predetermined adaptation criterion, for example, $a_n=r_n(1)/r_n(0)$ where $r_n(i)$ is the $i^{th}$ sample of the autocorrelation sequence. Frame blocker 302 frame blocks the speech signal in frames of N samples, with adjacent frames being separated by M samples. In this embodiment of the invention, N=M=160 when the sampling rate of the speech is 8 kHz, corresponding to 20 msec frames with no separation between them. There is one feature per frame so that for a one second utterance (50 frames long), 12 parameters represent the frame data, and a 50×12 matrix is generated (the template feature set). Windower 303 windows each individual frame to minimize the signal discontinuities at the beginning and end of each frame. In the preferred embodiment signal discontinuities at the beginning and end of each frame. In the preferred embodiment of this invention, where M=N, a rectangular window is used to avoid loss of data at the window boundaries. Autocorrelator 304 performs autocorrelation giving $$r_1(m) = \sum_{n=0}^{N-1-m} x_1(n)x_1(n+m) \quad \text{(Eqn 3)}$$

where m=0, 1, ..., p, and p is the order of the LPC analysis. The preferred embodiment of this invention uses p=10, but values of p from 8 to 16 can also be advantageously used in other embodiments and other values to increase accuracy are also within the contemplation of this invention. The zeroth autocorrelation is the frame energy of a given frame. Cepstral coefficient generator 305 converts each frame into cepstral coefficients (the inverse Fourier transform of the log magnitude spectrum, refer below) using Durbin's method, which is known in the art. Tapered cepstral windower 306 weights the cepstral coefficients in order to minimize the effects of noise. Tapered windower 306 is chosen to lower the sensitivity of the low-order cepstral coefficients to overall spectral slope and the high-order cepstral coefficients to noise (or other undesirable variability). Temporal differentiator 307 generates the first time derivative of the cepstral coefficients preferably employing an orthogonal polynomial fit to approximate (in this embodiment, a least-squares estimate of the derivative over a finite-length window) to produce processed signal S'(n). In another embodiment, the second time derivative can also be generated by temporal differentiator 307 using approximation techniques known in the art to provide further speech signal information and thus improve the representation of the spectral properties of the speech signal. Yet another embodiment skips the temporal differentiator to produce signal S"(n). It is understood that the above description of the front-end signal processor 102 using LPC and the above-described techniques are for disclosing the best embodiment, and that other techniques and methods of front end signal processing can be advantageously employed in the present invention. The comparison techniques and methods for matching strings of utterances, be they spelt letters or word strings, are substantially similar, so the following describes the techniques utilized in the preferred embodiment of both comparators 201 and 202.

In the preferred embodiment of the present invention, the parametric representation is by cepstral coefficients and the inputted speech is compared with the pronunciations in the prerecorded databases, by comparing cepstral distances. The inputted letters or characters (or letters or characters in word combination for comparator 202) generate a number of candidate letter (word) matches which are ranked according to similarity. In the comparison of the pre-recorded waveforms with the input waveforms, a sequential set of phonemes that are likely matches to the spoken input are generated which, when ordered in a matrix, produces a phoneme lattice. The lattice is ordered by assigning each inputted waveform a "score" value based upon the closeness of each inputted combination to a word in the vocabulary database. The "closeness" index is based upon the cepstral distance between the input waveform and the stored vocabulary waveforms, thereby generating "distortion scores". Since the scores are based on relatively accurate (compared with traditional speech recognition acoustic-phoneme methods) matches of letters (rather than whole words), the phoneme lattice produces word matches at 95% and above accuracy.

Figure 4:
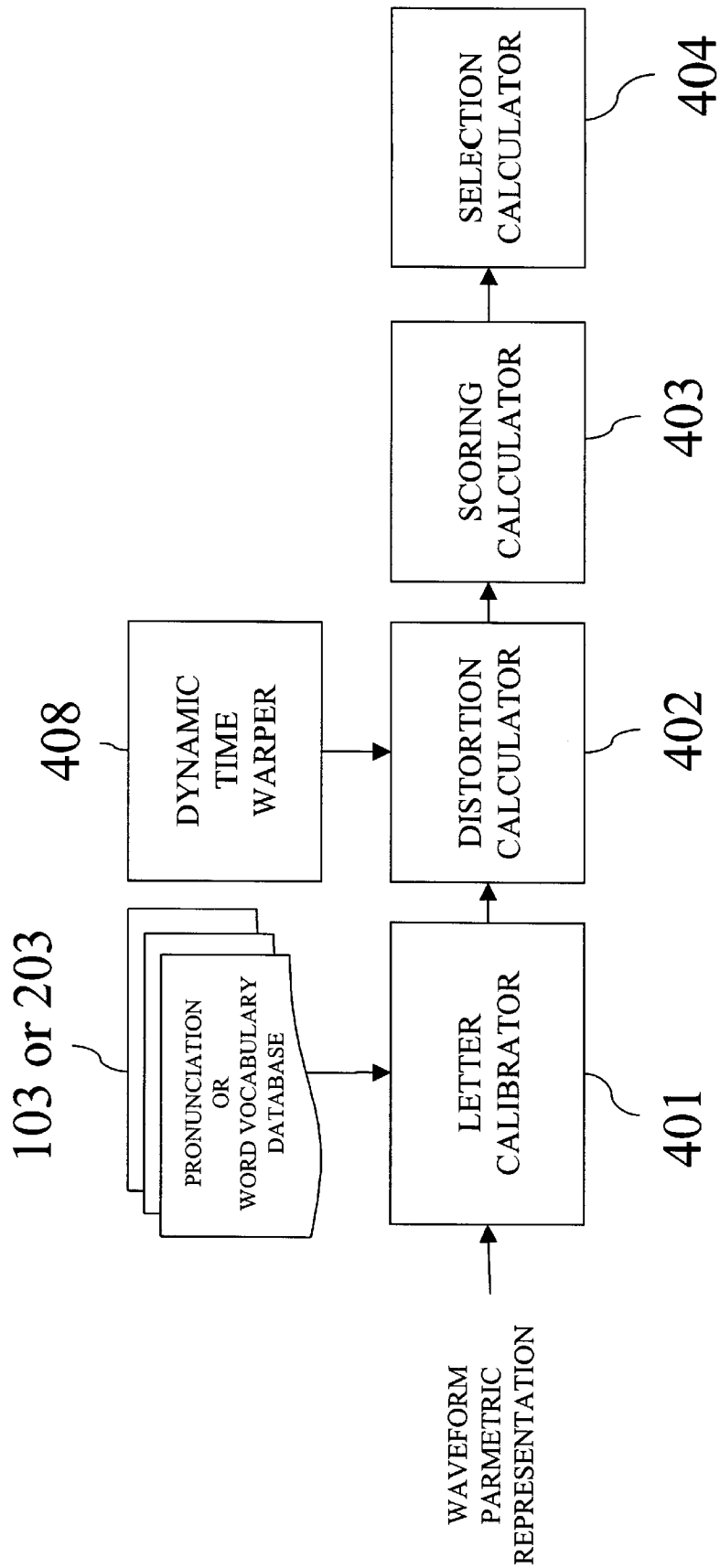
FIG. 4 is a block diagram of the letter speech recognition system according to the present invention.

FIG. 4 shows the waveform parametric representation inputted to letter calibrator 401 wherein, in conjunction with pronunciation database 103, a calibration matrix (example appended) is generated. Distortion calculator 402 calculates the distortion between the inputted speech and the entries in pronunciation database 103 based on, in the preferred embodiment, the cepstral distances described below. Scoring calculator 403 then assigns scores based on predetermined criteria (such as cepstral distances) and selector 404 selects the candidate letter (word). The difference between two speech spectra on a log magnitude versus frequency scale is $$V(\omega)=\log S(\omega)-\log S'(\omega). \quad \text{(Eqn 4)}$$

In the preferred embodiment, to represent the dissimilarity between two speech feature vectors, the preferred embodiment utilizes the mean absolute of the log magnitude (versus frequency), that is, a root mean squared (rms) log spectral distortion (or "distance") measure utilizing the set of norms $$d(S, S')^p = \int_{-\pi}^{\pi} |V(\omega)|^p \, d\omega / 2\pi \quad \text{(Eqn 5)}$$

where when p=1, this is the mean absolute log spectral distortion and when p=2, this is the rms log spectral distortion. In the preferred embodiment, the distance or distortion measure is represented by the complex cepstrum of a signal, which is defined as the Fourier transform of the log of the signal spectrum. For a power spectrum which is symmetric with respect to $\omega=0$ and is periodic for a sampled data sequence, the Fourier series representation of $\log S(\omega)$ is $$\log S(\omega) = \sum_{n=-\infty}^{\infty} c_n e^{-jn\omega} \quad \text{(Eqn 6)}$$

where $c_n = c_{-n}$ are the cepstral coefficients.

$$c_0 = \int_{-\pi}^{\pi} \log S(\omega) \, d\omega / 2\pi \quad \text{(Eqn 7)}$$

$$d(S, S')^2 = \int_{-\pi}^{\pi} |\log S(\omega) - \log S'(\omega)|^2 \, d\omega / 2\pi \quad \text{(Eqn 8)}$$
$$= \sum_{n=-\infty}^{\infty} (c_n - c_n')^2$$

where $c_n$ and $c_n'$ are the cepstral coefficients of $S(\omega)$ and $S'(\omega)$, respectively. By not summing infinitely, for example 10–30 terms in the preferred embodiment, the present invention utilizes a truncated cepstral distance. This efficiently (meaning relatively lower computation burdens) estimates the rms log spectral distance. Since the perceived loudness of a speech signal is approximately logarithmic, the choice of log spectral distance is well suited to discern subjective sound differences. Furthermore, the variability of low cepstral coefficients is primarily due to vagaries of speech and transmission distortions, thus the cepstrum (set of cepstral distances) is advantageously selected for the distortion measure. Different acoustic renditions of the same utterance are often spoken at different time rates so speaking rate variation and duration variation should not contribute to a linguistic dissimilarity score. Dynamic time warper (DTW) 408 performs the dynamic behavior analysis of the spectra to more accurately determine the dissimilarity between the inputted utterance and the matched database value. DTW 408 time-aligns and normalizes the speaking rate fluctuation by finding the "best" path through a grid mapping the acoustic features of the two patterns to be compared. In the preferred embodiment, DTW 408 finds the best path by a dynamic programming minimization of the dissimilarities. Two warping functions, $\phi_x$ and $\phi_y$, relate two temporal fluctuation indices, $i_x$ and $i_y$ respectively, of the speech pattern to a common time axis, k, so that $$i_x = \phi_x(k), \; k=1,2,\ldots,T$$
$$i_y = \phi_y(k), \; k=1,2,\ldots,T \quad \text{(Eqn 9)}$$

A global pattern dissimilarity measure is defined, based on the warping function pair, as the accumulated distortion over the entire utterance:

$$d_\varphi(X, Y) = \sum_{k=1}^{T} d(\varphi_x(k), \varphi_y(k)) m(k) / M_\varphi \quad \text{(Eqn 10)}$$

where $d(\phi_x(k), \phi_y(k))$ is a short-time spectral distortion defined for $X_{\phi X(k)} Y_{\phi Y(k)}$, $m(k)$ is a nonnegative weighting function, $M_\phi$ is a normalizing factor, and T is the "normal" duration of two speech patterns on the normal time scale. The path $\phi = (\phi_x, \phi_y)$ is chosen so as to measure the overall path dissimilarity with consistency. In the preferred embodiment of the present invention, the dissimilarity $d(X, Y)$ is defined as the minimum of $d_\phi(X, Y)$ over all paths, i.e., $$d(X, Y) = \min_\varphi d_\varphi(X, Y) \quad \text{(Eqn 11)}$$

The above definition is accurate when X and Y are utterances of the same word because minimizing the accumulated distortion along the alignment path means the dissimilarity is measured based on the best possible alignment to compensate for speaking rate differences. It is known in the art that dynamic programming can solve sequential decision problems such as that described immediately above by finding the optimal path, meaning the minimum "cost" of moving from one point to another point. In one embodiment of the present invention, since the number of steps involved in the move are determined by "if-then" statements, the sequential decision is asynchronous. The decision utilizes a recursion relation that allows the optimal path search to be conducted incrementally and is performed by an algorithm in the preferred embodiment of the present invention as described below. The decision rule for determining the next point in an optimal path (the "policy"), together with the destination point, completely defines the cost which is sought to be minimized. The optimal policy for a move from the initial point l to an intermediate point j incurring a cost $\zeta(j, i)$, is given by $$\varphi(l, i) = \min_j [\varphi(l, j) + \zeta(j, i)] \quad \text{(Eqn 12)}$$

so for the optimal sequence of moves and associated minimum cost from a point i to a point j, $$\varphi(i, j) = \min_l [\varphi(i, l) + \zeta(l, j)]. \quad \text{(Eqn 13)}$$

In another embodiment, the sequential decision is synchronous (regularity of decision process for a fixed number of moves, M), the associated minimum cost $\phi_m(i, l)$ is $$\varphi_{m+1}(i, n) = \min_l [\varphi_m(i, l) + \zeta(l, n)] \quad \text{(Eqn 14)}$$

which is the recursion relation used in an embodiment of the present invention. In both embodiments, the method follows the steps of (1) initialization, (2) recursion, (3) termination, and (4) backtracking as follows:

Initialization $\varphi_1(i, n) = \zeta(i, n)$
$\xi_1(n) = i$, for $n = 1, 2, \ldots, N$ -continued Recursion: $\varphi_{m+1}(i, n) = \min_{1 \le l \le N} [\varphi_m(i, l) + \zeta(l, n)]$ $\xi_{m+1}(n) = \arg \min_{1 \le l \le N} [\varphi_m(i, l) + \zeta(l, n)]$, for $n = 1, 2, \ldots, N$ and $m = 1, 2, \ldots, M-2$ Termination $\varphi_M(i, j) = \min_{1 \le l \le N} [\varphi_{M-1}(i, l) + \zeta(l, j)]$ $\xi_M(j) = \arg \min_{1 \le l \le N} [\varphi_{M-1}(i, l) + \zeta(l, j)]$ Path Bactracking optimal path $= (i, i_1, i_2, \ldots, i_{M-1}, j)$, where $i_m = \xi_{m+1}(i_{m+1}), m = M-1, M-2, \ldots, 1,$ with $i_M = j$.

The above algorithm is computationally efficient and thus suitable for the hand-held devices contemplated by this invention.

Figure 6:
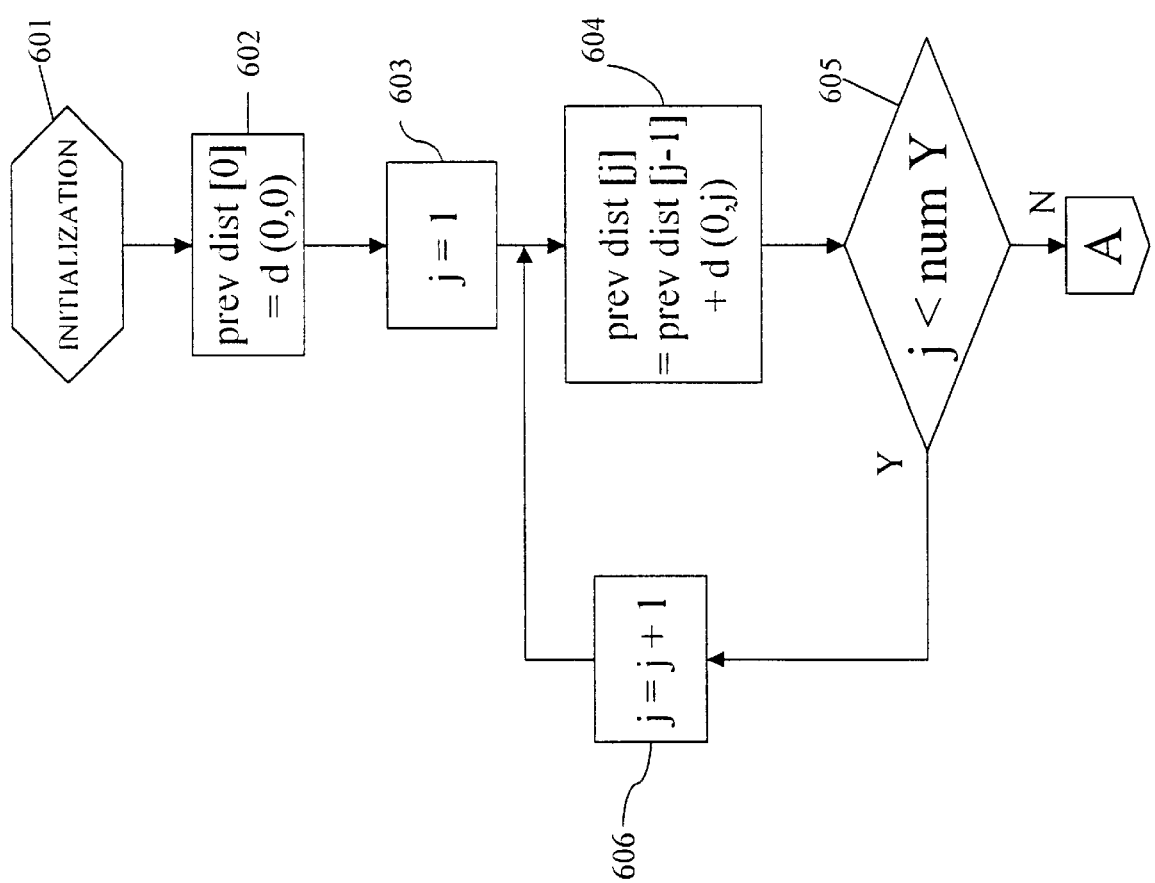
FIG. 6 is the dynamic time warping initialization flowchart procedure for calculating the Total Distortion cepstrum according to the present invention.
Figure 7:
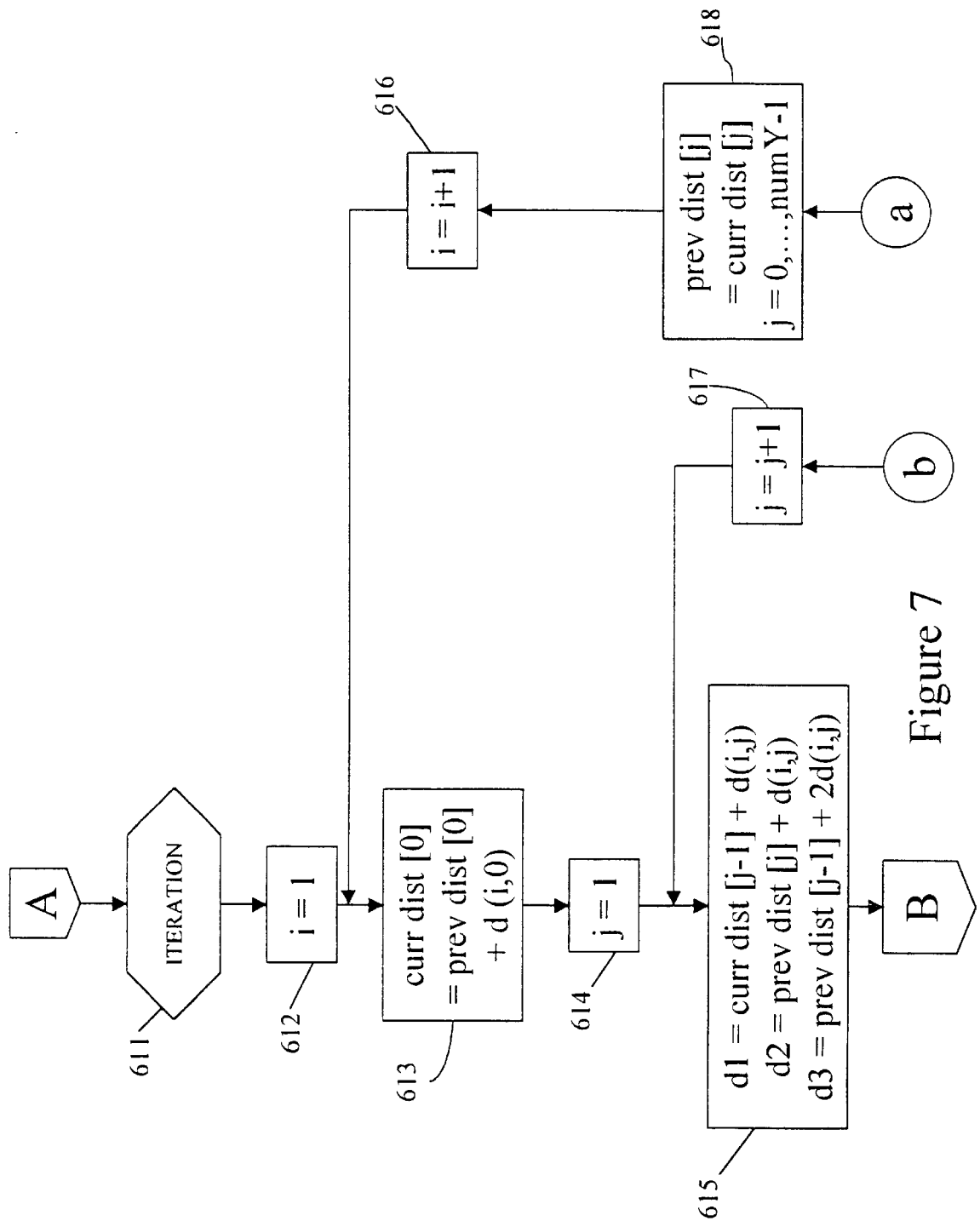
FIG. 7 is the dynamic time warping iteration procedure flowchart for calculating the Total Distortion cepstrum according to the present invention.
Figure 8:
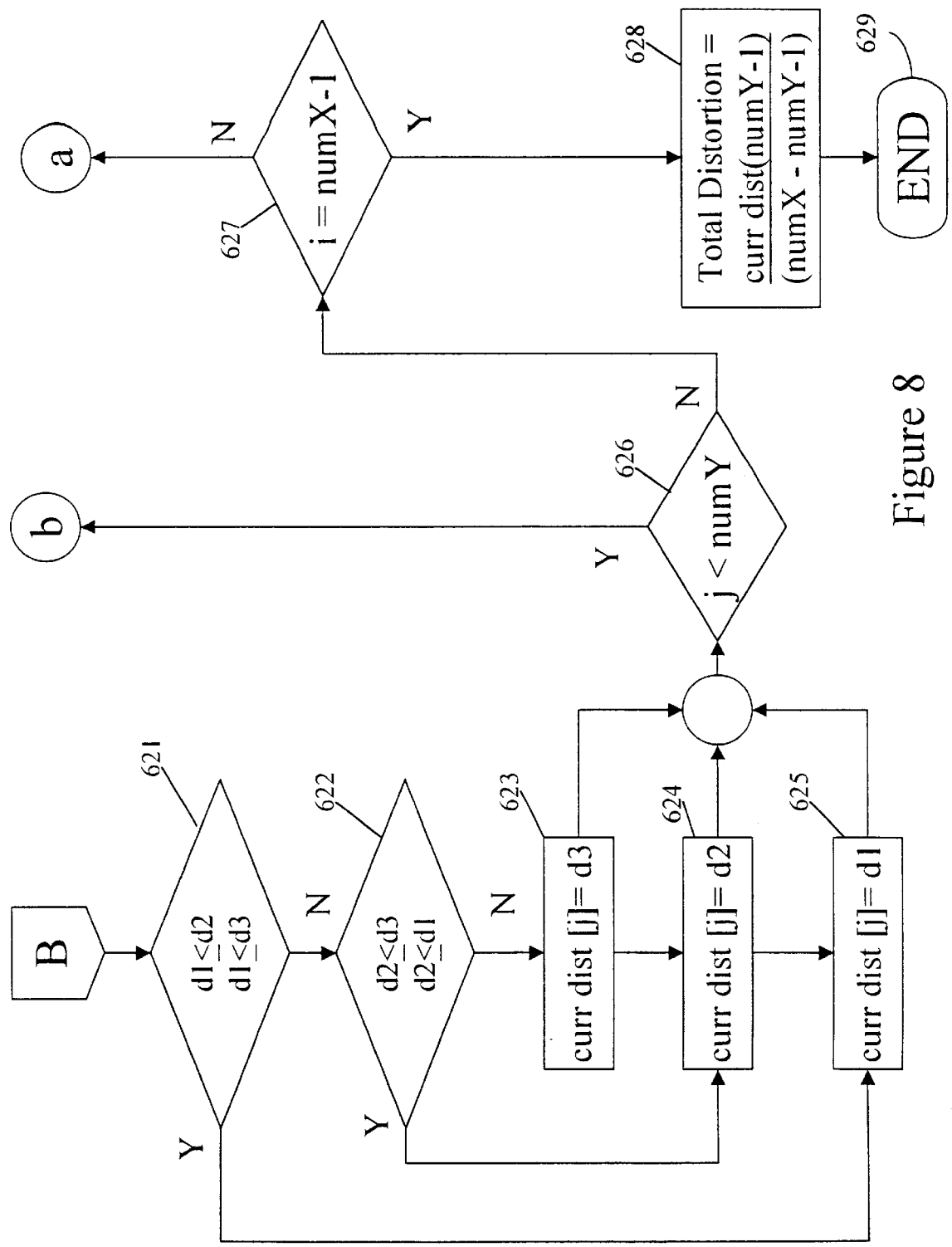
FIG. 8 is the dynamic time warping flowchart for calculating the relative values of the Total Distortion cepstrum according to the present invention.

FIGS. 6, 7, and 8, constitute a flow chart of the preferred embodiment of DTW 408 for computing the Total Distortion between templates to be compared. The "distance" d(i,j) (Eqn. (11) above) is the distortion between the $i^{th}$ feature of template X and the $j^{th}$ feature of template Y. FIG. 6 depicts the initialization procedure 601 wherein the previous distance is d(0,0) at 602. The index j is then incremented at 603 and the previous distance now is the distance at j (prev dist[j] which is equal to prev dist [j-1]+d(0,j). At 605, if j is less than number of features in template Y (j<num Y), then j will be incremented at 606 and fed back to 604 for a new calculation of prev dist[j]. If j is not greater than num Y, then the initialization is complete and the Iteration Procedure 611 for the Total Distortion begins as shown in FIG. 7. At 612, i is set at one and the current distance (curr dist[0]) is calculated as the prev dist[0] plus d(i,0). At 614, j is set to one and the possible paths leading to an associated distance d1, d2, or d3 are calculated 615 as:

curr dist[j-1]+d(i,j)=d 1 prev dist[j]+d(i,j)=d 2 prev dist[j-1]+2d(i,j)=d 3.

The relative values of the associated distances are then tested at 621 and 622 in FIG. 8. If d3 is not greater than d1 and not greater than d2, then d3 is the minimum and curr dist[j] will be d3 at 623. After testing for the $j^{th}$ feature as less than the number of features in the Y template at 626, then j is incremented at 617 and fed back to the calculation of distances of possible paths and the minimization process recurs. If d2 is greater than d1 and d3 is greater than d1, then d1 is the minimum and is thus set as the curr dist[j]at 625. Then j is again tested against the number of features in the Y template at 626, j is incremented at 617 and fed back for recursion. If d3 is greater d2 and d1 is greater than d2, then d2 is the minimum and is set as the curr dist[j] at 624 and the like process is repeated to be incremented and fed back. In this way, the minimum distance is found. If j is greater than or equal to the number of features in template Y at 626, then i is tested to see if it is equal to the number of features in template X minus 1. If i is not equal to the number of features in template X minus 1, then the previous distance is set as the current distance for the j indices (up to numY−1) at 618, i is incremented at 616 and fed back to 613 for the setting of the current distance as the previous distance plus the new $i^{th}$ distance and the process is repeated for every i up the time j equals the number of features in template X minus 1. If i is equal to the number of features in the X template minus 1, then the Total Distortion is calculated at 628 as $$\text{Total Distortion} = \frac{curr - dist(numY - 1)}{(numY - numY - 1)},$$

thus completing the algorithm for finding the total distortion.

To achieve optimum accuracy, the warping functions are constrained. It is known in the art that even small speech endpoint errors result in significant degradation in speech detection accuracy. In carefully-enunciated speech in controlled environments, high detection accuracy is attainable, but for general use (such as in cell phones), the vagaries of the speaker sounds (including lip smacks, breathing, clicking sounds, and so on) and background noise make accurate endpoint detection difficult. If the utterances have well-defined endpoints (marking the beginning and ending frames of the pattern), similarity comparisons will be more accurate. The present invention, in its utilization of spelling for input utterance, achieves accuracy as a result of the generally more precise enunciation of letters (as compared to words) and the typical pauses between letters when a word is spelled. Temporal variations thus are generally confined to the region within the endpoints. The constraints for the warping function are thus simply setting the values at the beginning and ending points as the first and last temporal fluctuation indices, $i_x=1$, and $i_y=T$. These endpoint constraints are incorporated into the present invention through Eqn (11), in terms of $T_x$ and $T_y$:

$$M_\varphi d(X, Y) \cong D(T_x, T_y) = \min_{\varphi_x, \varphi_y} \sum_{k=1}^{T} d(\varphi_x(k), \varphi_y(k)) m(k) \quad \text{(Eqn 15)}$$

where X and Y terminate at $T_x$ and $T_y$ respectively. The preferred embodiment of the present invention provides a dynamic time warping regime that is optimally suited for the spelling input utterance voice recognition system of the present invention. DTW 408 utilizes Eqn 15 to generate the minimum partial accumulated distortion along a path connecting (1,1) and $(i_x, i_y)$:

$$D(i_x, i_y) \cong \min_{\varphi_x, \varphi_y, T'} \sum_{k=1}^{T'} d(\varphi_x(k), \varphi_y(k)) m(k) \quad \text{(Eqn 16)}$$

where $\phi_x(T')=i_x$ and $\phi_y(T')=i_y$ and the dynamic programming recursion with constraints becomes $$D(i_x, i_y) = \min_{(i'_x, i'_y)} [D(i'_x, i'_y) + \zeta((i'_x, i'_y), (i_x, i_y))] \quad \text{(Eqn 17)}$$

where $\zeta$ is the weighted accumulated distortion (local distance) between points $(i_x', i_y')$ and $(i_x, i_y)$, $$\zeta((i'_x, i'_y), (i_x, i_y)) = \sum_{l=0}^{L} d(\varphi_x(T'-1), \varphi_y(T'-1)) m(T'-1) \quad \text{(Eqn 18)}$$

with $L_s$ being the number of moves in the path from $(i_x', i_y')$ to $(i_x, i_y)$ according to $\phi_x$ and $\phi_y$. The incremental distortion $\zeta$ is evaluated only along the paths defined by the various constraints, thus the minimization process can be effectively solved within the constraints. However, the heuristic nature of dissimilarity can also be advantageously included in the method; for example, in this invention a frame is cut into multiple segments to distinguish between confusable letter utterances, such as "a" and "f". It is understood that many different constraints and combinations of constraints are within the scope of the present invention. In the utterances of different letters, for instance, the time-alignment for the most accurate comparison is not a well-defined linguistic concept so intuitive constraints are utilized in the present invention.

In operation, a user may use the speaker-independent input default mode whereby the prepackaged letter database for speech recognition is used. In an embodiment of the invention, a menu selection allows the user to choose male or female voice recognition and language selection. Pronunciation database 103 includes prerecorded templates for male or female voices or different languages. If the user records his/her own voice in his/her selected language, this will be recorded in pronunciation database 103 so the male/female/language template is not necessary.

To create ("training") personalized database 100, a user records alphabet and numeral sounds by dictating into the system from (for an English example) "a" to "z" and "0" to "9" in a natural voice with a pause of at least 0.2 seconds between individual sounds, thereby generating a "voice string". In one embodiment of the invention, if the letters are run-on, the endpoint detection scheme described above will detect indistinguishable utterances, and the user will be instructed through the display to cease recitation and repeat the dictation from the beginning. The individual letters of the voice string are converted using front-end signal processor 102 which produces a waveform for each letter (such as that shown in FIG. 5). The waveforms are then segmented, assigned an address in memory and then stored in memory so that each utterance is mapped into pronunciation database 104 (a process termed "labeling"). Pronunciation database 103 in conjunction with letter utterance comparator 201 forms, for letters of the English alphabet, a 26×26 matrix wherein columns hold the stored waveforms for each letter in pronunciation database 104 and the rows will hold the inputted speech letters for recognition analysis (a sample matrix is appended). Letter utterance comparator 201 compares the inputted utterance with all the letters in the columns (pronunciation database 103) to find the best match. For example, the inputted word "seat" will be spelled by the user "s-e-a-t". Front-end signal processor 102 performs feature extraction which, for example, may produce 50 columns of coefficients (or vectors) per one second of speech. Letter utterance comparator 201 compares the cepstral distances of each letter with the entries in pronunciation database 103 from a to z utilizing dynamic time warping (DTW). If the inputted speech lasted for two seconds (100 frames), and each portion of the speech file were 25 frames each, letter utterance comparator 201 compares 25 columns of cepstral cepstral vectors with the 26 letters of the alphabet in pronunciation database 103. Assuming each letter in pronunciation database 103 is 25 frames long, the DTW comparison is 25×25. Because of the vagaries of pronunciation, background noise, and other factors, the letters may be recognized as "x-e-k-d" (each of which letter's pronunciation is similar to the desired letters, and therefore mistakenly "recognized"). In the preferred embodiment of this invention, before the comparison with letters in the database is made, letters with similar pronunciations are grouped together so that the search is more efficient. For example, the grouping in the preferred embodiment of this invention emphasizes the vowel sounds of the syllables and has been found to significantly reduce the similarity computation, thereby making the grouping ideal for hand-held devices. An example of the grouping assigns "a", "j", and "k" to the same group; "x", "s", and "f" to another group; and "b", "c", "d", "e", and "g" to yet another group. As an illustration of the distortion scoring technique, in the "s-e-a-t" example, the first letter "s" is initially recognized as "x" so there will be a non-zero distortion score assigned based on the cepstral distance (e.g., 2.0); the next letter "e" is correctly recognized, so the score will be 0; the next letter "a" is recognized as "k" which is assigned a score of 1.5; the last letter "t" is recognized as "d" which is assigned a score of 1.0. The total distortion score for the word is 4.5. The distortion scores are then compared in combination with the words in vocabulary database 203. The selected candidate letters, in combination however, are more distinct (and "xekd" does not exist as a word). Word similarity comparator 202 computes a distortion score using the sequence of letters "x-e-k-d" to produce distortion scores based on the distance between letters (for example, between "s" and "x", "a" and "k") with words as follows:

| Input Word | Candidates | Letter Scores | Distortion Score | Similarity % |
|---|---|---|---|---|
| xekd | seat | S1 + S2 + S3 + S4 = S | 1200 | 89% |
| | feat | T1 + T2 + T3 + T4 = T | 2380 | 75% |
| | heat | U1 + U2 + U3 + U4 = U | 4530 | 68% |
| | beat | V1 + V2 + V3 + V4 = V | 8820 | 42% |

Word similarity comparator 202 ranks the distortion scores of each comparison utilizing dynamic time warping (DTW) to determine the lowest distortion score. The DTW computation requires, in this example, only a 4×4 matrix (reflecting the length of the word), so computational efficiency is achieved. The closest match (or greatest similarity) with a word in vocabulary database 203 is "seat". Display 204 displays the selected word (or individual letter) for confirmation by the user. Any alphanumeric display device, for example a liquid crystal display (LCD), may be advantageously utilized. For uses in mobile phones or PDAs, the combination of letters then constitute the word which then can be matched to the telephone number or other transmission index for transmission.

Although many of the examples in this description are based on the English alphabet, it is understood that they are exemplary only and that the scope of the present invention includes other languages as well, the only restriction being that such language is based on distinguishable sounds. In fact, an embodiment of the present invention provides multiple-language capability since any language's speech recognition can be achieved by the present invention because it is primarily dependent upon the contents of the vocabulary database, which can be changed for any language. Similarity comparisons with the spoken sounds and the vocabulary database can be accomplished by the present invention as described above and accuracy can be achieved through the user's dictation of sounds to construct the pronunciation database 104.

Figure 9:
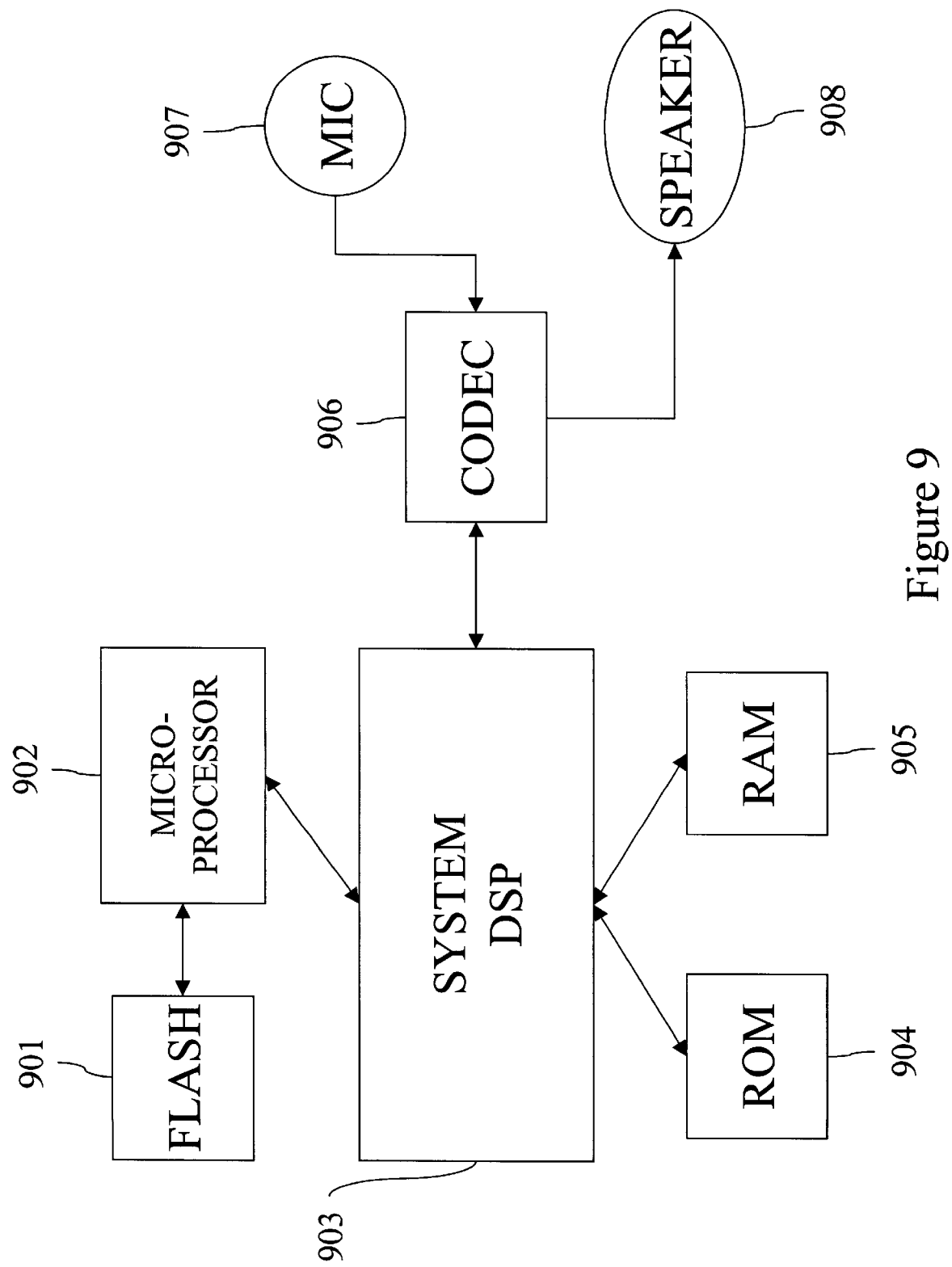
FIG. 9 is a block diagram of the system architecture of a cellular phone having an embodiment of the present invention embedded therein.

An embodiment of the present invention, due to its small form factor, allows simple integration into existing operating systems (for example, Microsoft Windows CE® for PDAs and ARM7TDMI for cell phones) of consumer electronic devices, thereby obviating extensive redesign and reprogramming. An embodiment of the present invention's speech recognition programs also may be loaded into the flash memory of a device such as a cell phone or PDA, thus allowing easy, quick, and inexpensive integration of the present invention into existing electronic devices, avoiding the redesign or reprogramming of the DSP of the host device. Further, the speech recognition programs may be loaded into the memory by the end-user through a data port coupled to the flash memory. This can be accomplished also through a download from the Internet. FIG. 9 illustrates the system architecture of a cellular phone with an embodiment of the present invention embedded therein. Flash memory 901 is coupled to microprocessor 902 which in turn is coupled to DSP processor 903, which in conjunction with flash memory 901 and microprocessor 902, performs the speech recognition described above. Read-Only-Memory (ROM) device 904 and Random Access Memory (RAM) device 905 service DSP processor 903 by providing memory storage for pronunciation database 104 and vocabulary database 203. Speech input through microphone 907 is coded by coder/decoder (CODEC) 906. After speech recognition by DSP processor 903, the speech signal is decoded by CODEC 906 and transmitted to speaker 908 for audio confirmation. Alternatively, speaker 908 can be a visual display. One embodiment of the application protocol interface (API) of the present invention conforms to the following specifications utilizing ARM77TDMI as base: Memory usage requires a code size of 10 KB, scratch pad size of 4KB, and the storage (per template) is 0.5 KB. Computational requirements are speech feature extraction of 1.9 MIPS and speech recognition per template of 0.5 MIPS.

Figure 10:
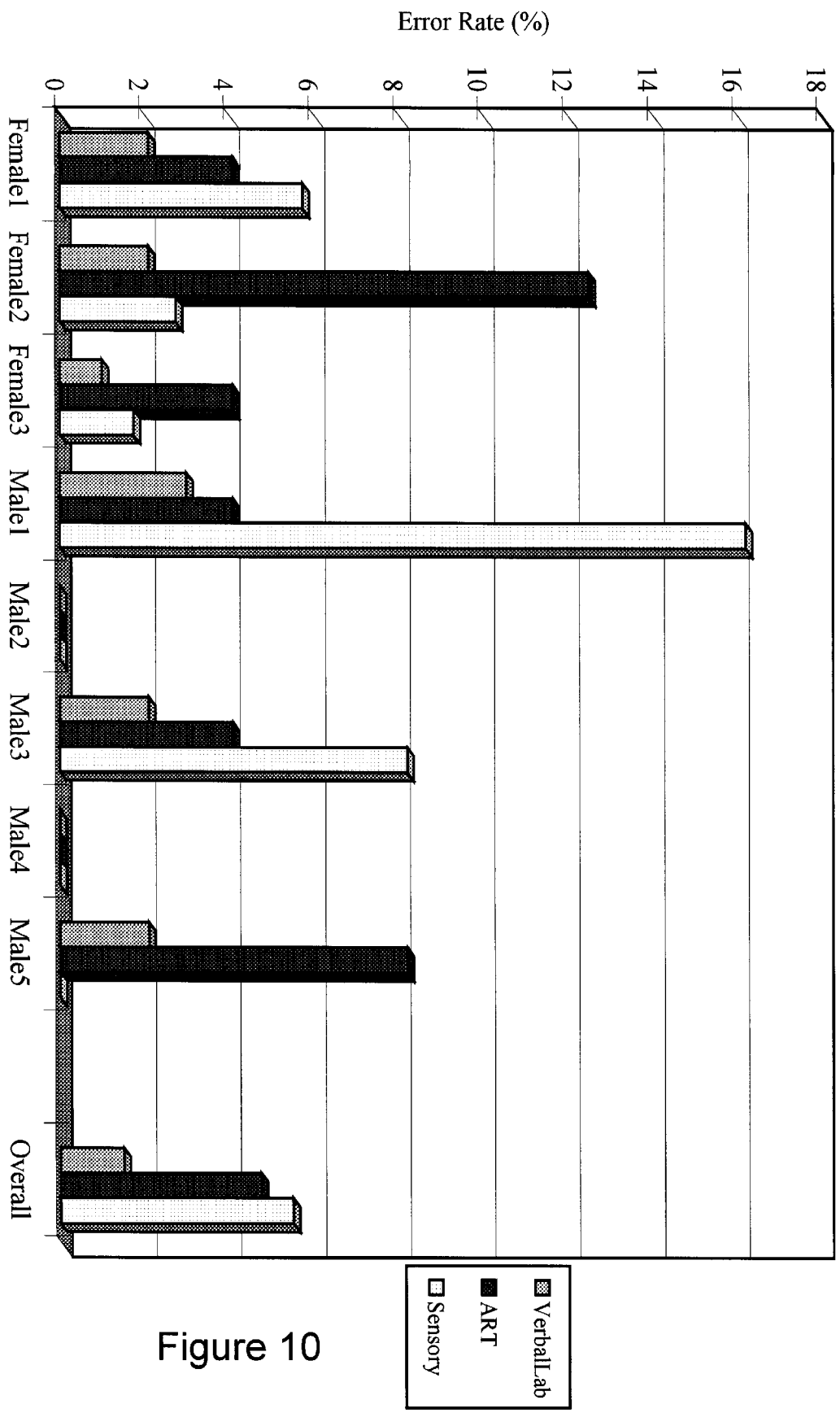
FIG. 10 illustrates the word recognition performance results of one embodiment of the present invention as compared to the prior art systems ART and Sensory

In typical use, the present invention allows voice recognition to be achieved in 1–2 seconds, thereby providing a smooth interface with the user. Accuracy in test results has been consistently at the 95% level. Name (word) recognition performance results of one embodiment of the present invention are shown in FIG. 10 where the error rate of the present invention (VerbalLab) is compared to the prior art systems ART and Sensory. The test used 24 names of which 8 (Mickey Mouse, Minnie Mouse, Minnie Driver, Bill Gates, Bill Clinton, Julius Smith, Julia Roberts, and Bruce Willis) were deemed ambiguous, and 8 speakers (3 female and 5 male). For all speakers in this test, the present invention had significantly lower error rates, with an overall result of an error rate less than half of that of the other systems tested.

It is particularly noted herein that the present invention is ideal for inputting the monosyllabic character-based letters (or words) of the Chinese and Korean languages. For example, the words for "mobile phone" are transliterated as a character string "xing-dong-dian-hua". Each word is monosyllabic and has its own meaning (or several meanings), but in aggregate comprise the unique term for "mobile phone". The present invention provides a highly accurate recognition (in part due to heuristic calibration) of individual monosyllabic letters, which when taken in aggregate to form a word, produces even more accurate recognition because of the limited number of sensible choices.

While the above is a full description of the specific embodiments, various modifications, alternative constructions and equivalents may be used. For example, the present invention is suitable for any verbal language that can be separated into utterances; alphabetical languages where the utterances are associated with letters of an alphabet (such as English and Russian) and symbolic languages where the utterances are associated with characters (such as Chinese, Korean, and Japanese). Further, for enhanced recognition accuracy, the constraints in the DTW scheme may be chosen from a number of possibilities to advantageously produce accurate speech recognition. Therefore, the above description and illustrations should not be taken as limiting the scope of the present invention which is defined by the appended claims.

What is claimed is:

1. A speech recognition system comprising:

microphone means for receiving acoustic waves and converting the acoustic waves into electronic signals;

front-end signal processing means, coupled to said microphone means, for processing the electronic signals to generate parametric representations of the electronic signals, including preemphasizer means for spectrally flattening the electronic signals generated by said microphone means; frame-blocking means, coupled to said preemphasizer means, for blocking the electronic signals into frames of N samples with adjacent frames separated by M samples; windowing means, coupled to said frame-blocking means, for windowing each frame; autocorrelation means, coupled to said windowing means, for autocorrelating the frames; cepstral coefficient generating means, coupled to said autocorrelation means, for converting each frame into cepstral coefficients; and tapered windowing means, coupled to said cepstral coefficient generating means, for weighting the cepstral coefficients, thereby generating parametric representations of the sound waves;

pronunciation database storage means for storing a plurality of parametric representations of letter pronunciations;

letter similarity comparator means, coupled to said front-end signal processing means and to said pronunciation database storage means, for comparing the parametric representation of the electronic signals with said plurality of parametric representations of letter pronunciations, and generating a first sequence of associations between the parametric representation of the electronic signals and said plurality of parametric representations of letter pronunciations responsive to predetermined criteria;

vocabulary database storage means for storing a plurality of parametric representations of word pronunciations;

word similarity comparator means, coupled to said letter similarity comparator and to said vocabulary database storage means, for comparing an aggregated plurality of parametric representations of letter pronunciations with said plurality of parametric representations of word pronunciations, and generating a second sequence of associations between at least one of said aggregated plurality of parametric representations of the letter pronunciations with at least one of said plurality of parametric representations of word pronunciations responsive to predetermined criteria; and display means, coupled to said word similarity comparator means, for displaying said first and second sequences of associations.

2. The speech recognition system of claim 1 wherein said front-end signal processing means further comprises temporal differentiating means, coupled to said tapered windowing means, for generating a first time derivative of the cepstral coefficients.

3. The speech recognition system of claim 1 wherein said front-end signal processing means further comprises temporal differentiating means, coupled to said tapered windowing means, for generating a second time derivative of the cepstral coefficients.

4. The speech recognition system of claim 1 wherein said letter similarity comparator means comprises:

letter calibration means, coupled to said pronunciation database storage means, for calibrating the parametric representations of the electronic signals with said plurality of parametric representations of letter pronunciation stored in said pronunciation database storage means;

dynamic time warper means for performing dynamic time warping on the parametric representations of the electronic signals and said plurality of parametric representations of letter pronunciations stored in said pronunciation database storage means;

distortion calculation means, coupled to said letter calibration means and to said dynamic time warper means, for calculating a distortion between the parametric representations of the electronic signals and said plurality of parametric representations of letter pronunciations stored in said pronunciation database storage means;

scoring means, coupled to said distortion calculation means, for assigning a score to said distortion responsive to predetermined criteria; and selection means, coupled to said scoring means, for selecting at least one of said plurality of parametric representations of letter pronunciations stored in said pronunciation database storage means having the lowest distortion.

5. The speech recognition system of claim 4 wherein said dynamic time warper means comprises minimization means for determining the minimum cepstral distances between the parametric representation of the electronic signals and said plurality of parametric representations of the letter pronunciations stored in said pronunciation database storage means.

6. The speech recognition system of claim 1 wherein said plurality of parametric representations of letter pronunciations stored in said pronunciation database storage means include the pronunciation of individual characters of the Chinese language and said plurality of parametric representations of word pronunciations stored in said vocabulary database storage means include the pronunciation of aggregated word strings of the Chinese language.

7. The speech recognition system of claim 1 wherein said plurality of parametric representations of letter pronunciations stored in said pronunciation database storage means include the pronunciation of individual characters of the Korean language and said plurality of parametric representations of word pronunciations stored in said vocabulary database storage means include the pronunciation of aggregated word strings of the Korean language.

8. The speech recognition system of claim 1 wherein said plurality of parametric representations of letter pronunciations stored in said pronunciation database storage means include the pronunciation of individual characters of the Japanese language and said plurality of parametric representations of word pronunciations stored in said vocabulary database storage means include the pronunciation of aggregated word strings of the Japanese language.

9. The speech recognition system of claim 1 wherein said plurality of parametric representations of letter pronunciations stored in said pronunciation database storage means include the pronunciation of individual characters of the French language and said plurality of parametric representations of word pronunciations stored in said vocabulary database storage means include the pronunciation of aggregated word strings of the French language.

10. A letter similarity comparator comprising:

means for receiving electronic signals parametric representations;

pronunciation database storage means for storing a plurality of letter pronunciation parametric representations;

letter calibration means, coupled to said receiving means and to said pronunciation database storage means, for calibrating the electronic signals parametric representations with said plurality of letter pronunciation parametric representations stored in said pronunciation database storage means;

dynamic time warper means for performing dynamic time warping on the electronic signals parametric representations and said plurality of letter pronunciation parametric representations stored in said pronunciation database storage means;

distortion calculation means, coupled to said letter calibration means and to said dynamic time warper means, for calculating a distortion between the electronic signals parametric representations and said plurality of letter pronunciation parametric representations stored in said pronunciation database storage means;

scoring means, coupled to said distortion calculation means, for assigning a score to said distortion responsive to predetermined criteria; and selection means, coupled to said scoring means, for selecting at least one of said plurality of letter pronunciation parametric representations having the lowest distortion.

11. An electronic communication device comprising:

a microphone for receiving sound signals and generating electronic signals therefrom;

a coder-decoder, coupled to said microphone, for coding and decoding the electronic signals;

a signal processor, coupled to said coder-decoder, for processing the electronic signals thereby generating parametric representations of the electronic signals;

a database storage unit, coupled to said signal processor, for storing data and having a first sector therein for storing a plurality of letter pronunciation parametric representations and a second sector therein for storing a plurality of word pronunciation parametric representations;

a first comparator, coupled to said signal processor and to said database storage unit, for comparing parametric representations of the electronic signals with said plurality of letter pronunciation parametric representations in said first sector of said database storage unit;

a first selector, coupled to said first comparator, for selecting at least one of said plurality of letter pronunciation parametric representations responsive to predetermined criteria;

a second comparator, coupled to said signal processor and to said database storage unit, for comparing aggregated parametric representations of letter pronunciations with said plurality of word pronunciation parametric representations in said second sector of said database storage unit;

a second selector, coupled to said second comparator, for selecting at least one of said plurality of word pronunciation parametric representations responsive to predetermined criteria; and a display, coupled to said first and second selectors, for displaying said at least one of said plurality of selected letter pronunciation parametric representations and for displaying said at least one of said plurality of word pronunciation parametric representations.

12. The electronic communication device of claim 11 wherein said plurality of letter pronunciation parametric representations stored in said first sector of said database storage unit are grouped responsive to similarity of parametric representation.

13. The electronic communication device of claim 11 wherein said first comparator calibrates the parametric representations of the electronic signals responsive to said plurality of letter pronunciation parametric representations in said first sector of said database storage unit.

14. The electronic communication device of claim 11 wherein said digital signal processor calculates cepstral coefficients to generate the parametric representations of the electronic signals, the plurality of letter pronunciation parametric representations, and said plurality of word pronunciation parametric representations.

15. The electronic communication device of claim 11 wherein said first comparator utilizes dynamic time warping to generate comparisons of the parametric representations of the electronic signals with said plurality of letter pronunciation parametric representations.

16. The electronic communication device of claim 15 wherein said first comparator utilizes cepstral distances to compare the parametric representations of the electronic signals with said plurality of letter pronunciation parametric representations.

17. The electronic communication device of claim 11 wherein said second comparator utilizes dynamic time warping to generate comparisons of said aggregated plurality of letter pronunciation parametric representations with said plurality of word pronunciation parametric representations.

18. The electronic communication device of claim 17 wherein said second comparator utilizes letter pronunciation sequences to compare the parametric representations of said aggregated plurality of letter pronunciations with said plurality of word pronunciation parametric representations stored in said database storage unit.

19. The electronic communication device of claim 17 wherein said second comparator utilizes cepstral distances to compare the parametric representations of said aggregated plurality of letter pronunciations with said plurality of word pronunciation parametric representations stored in said database storage unit.

20. A method for recognizing speech sound signals, comprising the steps of:

forming a stored database of letter and word sounds including the steps of, (a) parameterizing a plurality of letter sounds;

(b) storing said plurality of parameterized letter sounds;

(c) parameterizing a plurality of word sounds;

(d) storing said plurality of parameterized of word sounds; performing speech recognition of input speech including the steps of, (e) receiving sound waves;

(f) converting the sound waves into electronic signals;

(g) parameterizing the electronic signals;

(h) comparing said parameterized electronic signals with said stored plurality of parameterized letter sounds responsive to calibrating said plurality of parameterized electronic signals with said plurality of parameterized letter sounds responsive to a predetermined calibration method;

(i) selecting at least one of said stored plurality of parameterized letter sounds responsive to predetermined parameter similarity criteria;

(j) displaying said selected at least one of said stored plurality of parameterized letter sounds;

(k) aggregating said selected at least one of said stored plurality of parameterized letter sounds to form a parameterized word;

(l) comparing said parameterized word with said stored plurality of parameterized word sounds;

(m) selecting at least one of said stored plurality of parameterized word sounds responsive to predetermined parameter similarity criteria; and (n) displaying said selected at least one of said stored plurality of parameterized word sounds.

21. A method for recognizing speech sound signals, comprising the steps of:

forming a stored database of letter and word sounds including the steps of, (a) speaking a plurality of letter sounds;

(b) distinguishing whether the speaker is male or female;

(c) parameterizing said plurality of letter sounds;

(d) storing said plurality of parameterized letter sounds;

(e) parameterizing a plurality of word sounds;

(f) storing said plurality of parameterized of word sounds; performing speech recognition of input speech including the steps of, (g) receiving sound waves;

(h) converting the sound waves into electronic signals;

(i) parameterizing the electronic signals;

(j) comparing said parameterized electronic signals with said stored plurality of parameterized letter sounds;

(k) selecting at least one of said stored plurality of parameterized letter sounds responsive to predetermined parameter similarity criteria;

(l) displaying said selected at least one of said stored plurality of parame-terized letter sounds;

(m) aggregating said selected at least one of said stored plurality of parameterized letter sounds to form a parameterized word, (n) comparing said parameterized word with said stored plurality of parameterized word sounds;

(o) selecting at least one of said stored plurality of parameterized word sounds responsive to predetermined parameter similarity criteria; and (p) displaying said selected at least one of said stored plurality of parameterized word sounds.

22. A method for recognizing speech sound signals, comprising the steps of:

forming a stored database of letter and word sounds including the steps of, (a) speaking a plurality of letter sounds;

(b) distinguishing the endpoints of each letter sound responsive to the spoken letter sounds, thereby distinguishing substantially clear spoken letter sounds;

(c) parameterizing said plurality of letter sounds;

(d) storing said plurality of parameterized letter sounds;

(e) parameterizing a plurality of word sounds;

(f) storing said plurality of parameterized of word sounds;

performing, speech recognition of input speech including the steps of, (g) receiving sound waves;

(h) converting the sound waves into electronic signals;

(i) parameterizing the electronic signals;

(j) comparing said parameterized electronic signals with said stored plurality of parameterized letter sounds;

(k) selecting at least one of said stored plurality of parameterized letter sounds responsive to predetermined parameter similarity criteria;

(l) displaying said selected at least one of said stored plurality of parameterized letter sounds;

(m) aggregating said selected at least one of said stored plurality of parameterized letter sounds to form a parameterized word;

(n) comparing said parameterized word with said stored plurality of parameterized word sounds;

(o) selecting at least one of said stored plurality of parameterized word sounds responsive to predetermined parameter similarity criteria; and (p) displaying said selected at least one of said stored plurality of parameterized word sounds.

* * * * *